No. 755,971. PATENTED MAR. 29, 1904.
J. W. WALLACE.
TANK.
APPLICATION FILED SEPT. 11, 1902.
NO MODEL.
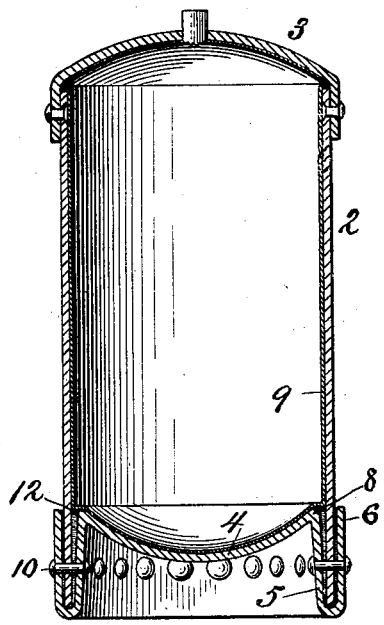
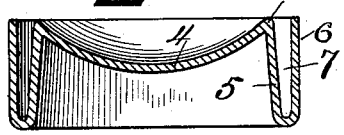
Witnesses.
J. B. McGirr.
J. Mackay.
Inventor.
John W. Wallace
By H. A. West
Attorney No. 755,971. Patented March 29, 1904.

UNITED STATES PATENT OFFICE.

JOHN W. WALLACE, OF BROOKLYN, NEW YORK.

TANK.

SPECIFICATION forming part of Letters Patent No. 755,971, dated March 29, 1904.

Application filed September 11, 1902. Serial No. 122,937. (No model.)

*To all whom it may concern:*

Be it known that I, JOHN W. WALLACE, a citizen of the United States, and a resident of Brooklyn, in the county of Kings and State of New York, have invented certain new and useful Improvements in Tanks, of which the following is a specification.

My invention relates to the construction of pressure-tanks, such as are used for holding carbonated water, liquid carbonic-acid gas, liquid air, and other liquids and gases which exert high internal pressure on the tank. In constructing such tanks, especially soda-water tanks and all others with which I am familiar, it is usual to make them of three main parts—*i. e.*, the body, top, and the bottom. These must be absolutely tight at the joints, and the joints must be of great strength to resist the interior pressure, and so far as I am aware no means has been found for making the joints but by soldering or brazing. No material difficulty arises in securing to the body one of the end pieces—say the top. The top being on, the work of soldering or brazing the bottom must all be done from the outside, and prior to my invention whether the soldering or brazing were perfectly or imperfectly done was never known. Imperfect soldering or brazing of the bottom renders the tank dangerous, and imperfect work cannot be repaired except by entirely removing the bottom, cleaning it of solder, and doing the whole work over again, and in case the tank be provided with a lining of metal—a tin "capsule," as it is termed—as is necessary with soda-water tanks, the soldering or brazing as done in the usual way is not only liable to be imperfect generally, but the solder is liable to get into the inside of the tank and puncture the tin lining. Furthermore, when the pressure-tank is charged the internal pressure tends to bulge the body of the tank, and this bulging marks the weak point of the tank, for if the bulging be not limited or confined to the space above the bottom—in other words, if it takes place abreast of the upper edge of the bottom—a crack or a V-shaped opening will be formed between the body and the bottom, and this space will gradually be enlarged by the filling and emptying of the tank. The first filling may only slightly cleave the body from the bottom; but this will be enlarged by subsequent filling, thus gradually weakening the tank toward the point of danger. If the tank be a soda-water tank lined with tin, any separation of the body away from the solder will cause the pressure to force the lining into the opening, and when the tank is emptied the closing back of the body will cut a hole in the tin, and thus ruin the tank for soda-water purposes, for if there is any opening in the lining gas under pressure will enter between the lining and the body of the tank, and in emptying the tank the pressure of this confined gas will collapse the lining.

The object of my invention is to overcome these difficulties; and it consists in making the bottom with an outside flange the same height as the top or uppermost edge of the bottom inside of the body and having molten metal, brazing, or solder poured or run in by the use of a blow-pipe between the outside flange and the body of the tank, so that it will rise on the inside to the top of the upper edge of the bottom, thus not only filling all the space between the body and the bottom, but reinforcing the body, so that any bulging of the body by internal pressure will be at a point above the brazing or soldering, and thus will not separate the body from the solder or the solder from the bottom.

In the accompanying drawings, to which reference is made and which form a part of this specification, Figure 1 is a sectional elevation showing my invention applied to a soda-water tank, and Fig. 2 is a sectional elevation of the end piece or bottom.

In the drawings, 2 designates the cylinder or body of the tank, and 3 the top. These may be of the usual or of any approved construction. The bottom 4 is of sheet-steel formed with the inner downwardly-projecting flange 5 and with the upwardly-projecting outer flange 6, the said flanges forming a space 7 below the angle or bend 8 of the bottom and wider than the thickness of the material of the cylinder or body 2.

In constructing the tank the top 3 is secured to the boby 2 and the lining 9 inserted in the usual way. Then the lower end of the body is set into the end piece or bottom, so as to center in the surrounding space 7, and then the whole is set upon a level table or other support. The angle or bend 8 is accurately formed all around, so as to be on a level with the upper edge of the outside flange 6 or on a level with the lowest point of the upper edge of the said outer flange. The said outer flange 6 therefore in soldering becomes a dam for the molten solder whose level is equal to the level of the highest interior point or edge of the bottom. Solder is now melted into the space 7 and the supplying of melted solder is continued until it begins to overflow at the outside. When this occurs, the solder will have reached the highest point of the bottom inside of the cylinder or body and has filled all the space between the bottom and the inner surface of the body of the tank, so that no sharp angles will be left or formed which would rupture the lining when pressure is applied to set or stretch it into place. Furthermore, in this way while the soldering may be made perfect there is no danger of causing solder to overflow the upper bend or edge 8 upon or into the interior of the bottom, which if it did would cause a rough surface which would cause a puncture to be formed in the lining. After the soldering is completed any desired number of rivets 10 may be inserted through the two flanges of the end piece or bottom and through the body, as shown in Fig. 1.

My invention is applicable more especially to soda-water tanks or tanks for aerated waters. In all soda-water tanks the pressure tends to bulge the body of the tank and to press or bend downward and outward the bottom 4, which must be concaved to facilitate the drawing out of all the contents. As a result there is a tendency with each filling and emptying of the tank to strain the bottom and body apart. With my invention a very rigid structure is formed between the body and the end piece or bottom, so that practically all movement of the body and bottom to and from each other at the angle or bend 8 is obviated, the outer flange 6 acting as a hoop or truss to the body and the solder 12 serving to reinforce and strengthen the inner flange as well as the end of the body or cylinder. As a further advantage the flanges 5 and 6 serve as a wearing-foot to the tank, and the tank may be safely used practically until the wear reaches the rivets, the three thicknesses of metal and the interposing solder serving as a practically indestructible foot-piece or base.

Having thus described my invention, what I claim as new, and desire to secure by Letters Patent, is—

1. A pressure-tank comprising a main body of metal, a metal bottom elevated in said body and formed with an angle or bend 8, an inner flange 5 integral with and depending from said angle or bend, an outer flange 6 spaced from and integral with said inner flange and rising from the lower edge thereof so that the lowest point of its upper edge is on a level with the said angle or bend, and an integral body of brazing metal, or solder, interposed between the surfaces of the main body and the adjacent surfaces of the said flanges, said body of brazing metal or solder rising to a level with the said angle 8, substantially as described.

2. In a pressure-tank, a main body of metal, a metal bottom elevated in said body and formed with an angle or bend 8, an outwardly-flaring inner flange 5 integral with and depending from said angle or bend, an outer flange 6 spaced from and integral with said inner flange and rising from the lower edge thereof so that the lowest point of its upper edge is on a level with the said angle or bend, and an integral body of brazing metal, or solder, interposed between the surfaces of the main body and the adjacent surfaces of the said flanges, the body of brazing metal or solder forming a flush seat 12 between the apex of said angle or bend 8 and the inner surface of the body of the tank which seat is wider or thicker than the brazing metal or solder beneath it, substantially as described.

3. A pressure-tank comprising a main body of metal, a metal bottom elevated in said body and formed with an angle or bend 8, an inner flange integral with and depending from said angle or bend, an outer flange 6 spaced from and integral with said inner flange and rising from the lower edge thereof so that the lowest point of its upper edge is on a level with the said angle or bend, an integral body of brazing metal, or solder, interposed between the surfaces of the main body and the adjacent surfaces of the said flanges and forming a seat 12 between the main body and the apex of the said angle or bend and a lining 9 for the body of the tank, substantially as described.

4. A pressure-tank comprising a main body of metal, a metal bottom elevated in said body and formed with an angle or bend 8, an outwardly-flaring inner flange 5 integral with and depending from said angle or bend, an outer flange 6 spaced from and integral with said inner flange and rising from the lower edge thereof so that the lowest point of its upper edge is on a level with the said angle or bend, an integral body of brazing metal, or solder, interposed between the surfaces of the main body and the adjacent surfaces of the said flanges, the body of brazing metal or solder forming a flush seat 12 between the apex of said angle or bend 8 and the inner surface of the body-tank which seat is wider or thicker than the brazing metal or solder beneath it and a lining for said tank, substantially as described.

JOHN W. WALLACE.

Witnesses:
H. A. WEST,
J. MAKAY.